Feb. 27, 1934.　　　J. F. O'ROURKE　　　1,948,934
SUBMARINE AIRLOCK
Filed Jan. 30, 1929　　8 Sheets-Sheet 1

INVENTOR
John F. O'Rourke
BY
Charles G. Hensley
ATTORNEY

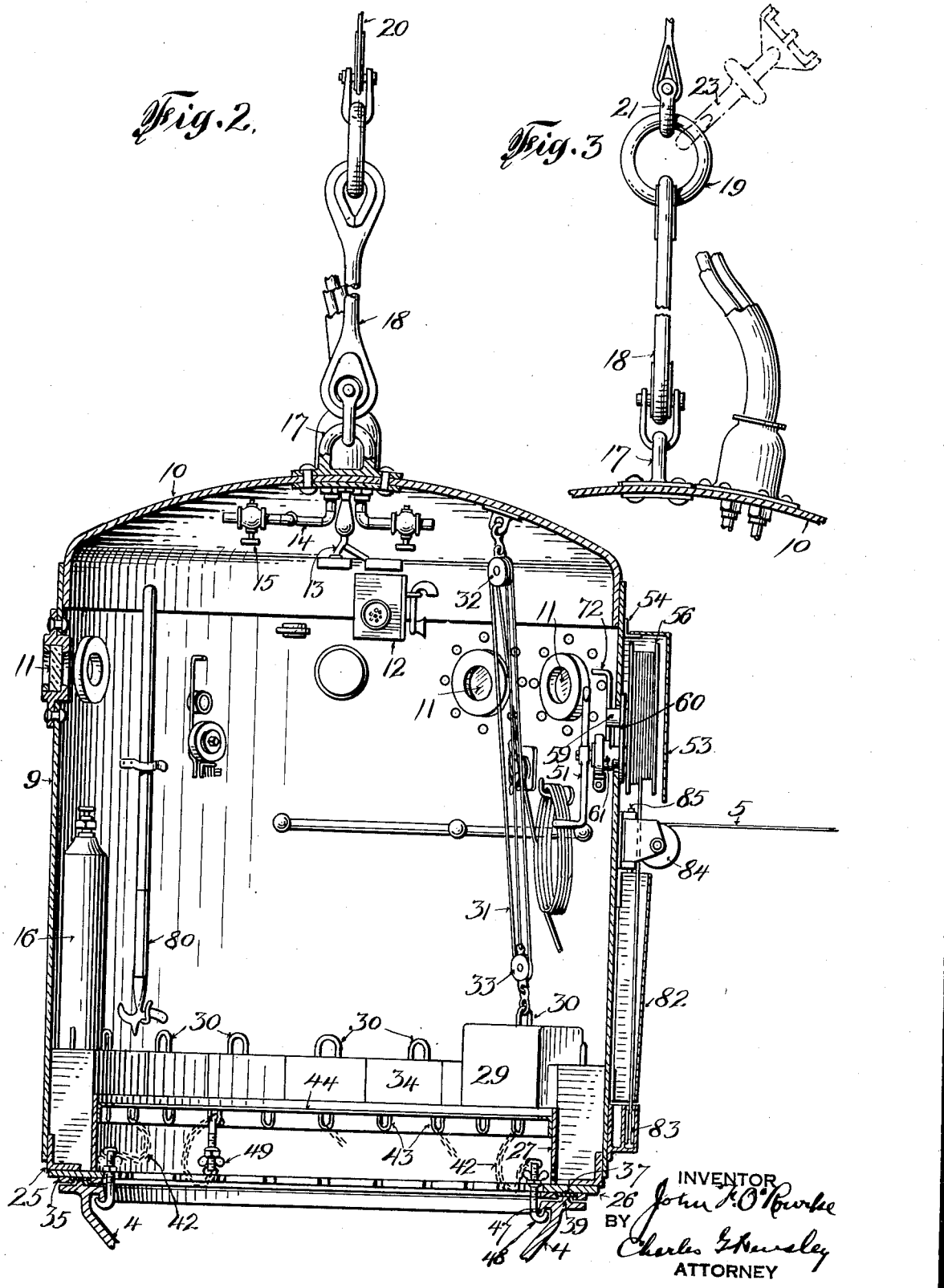

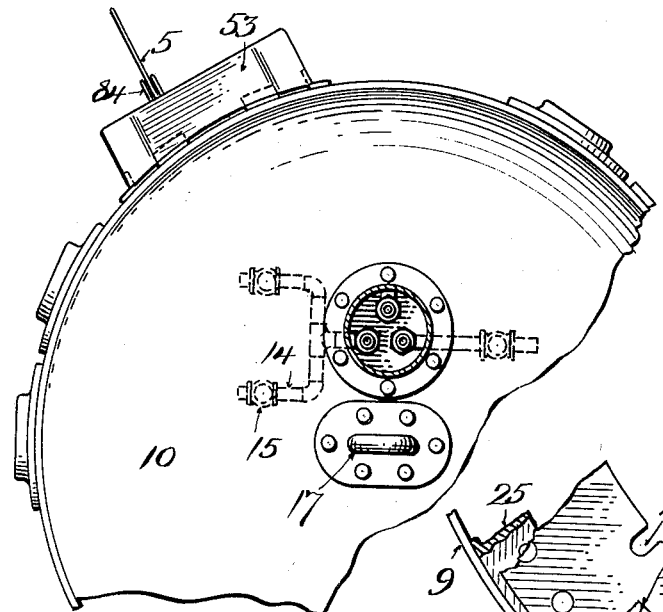
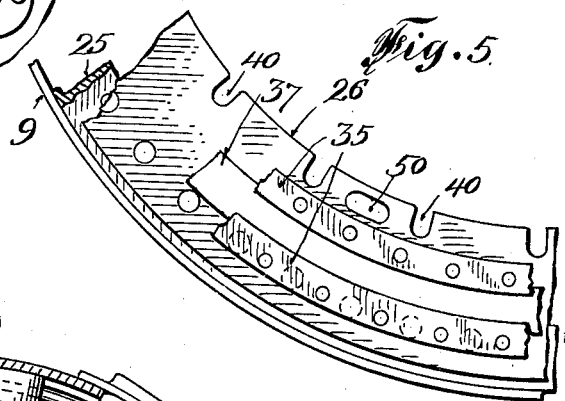
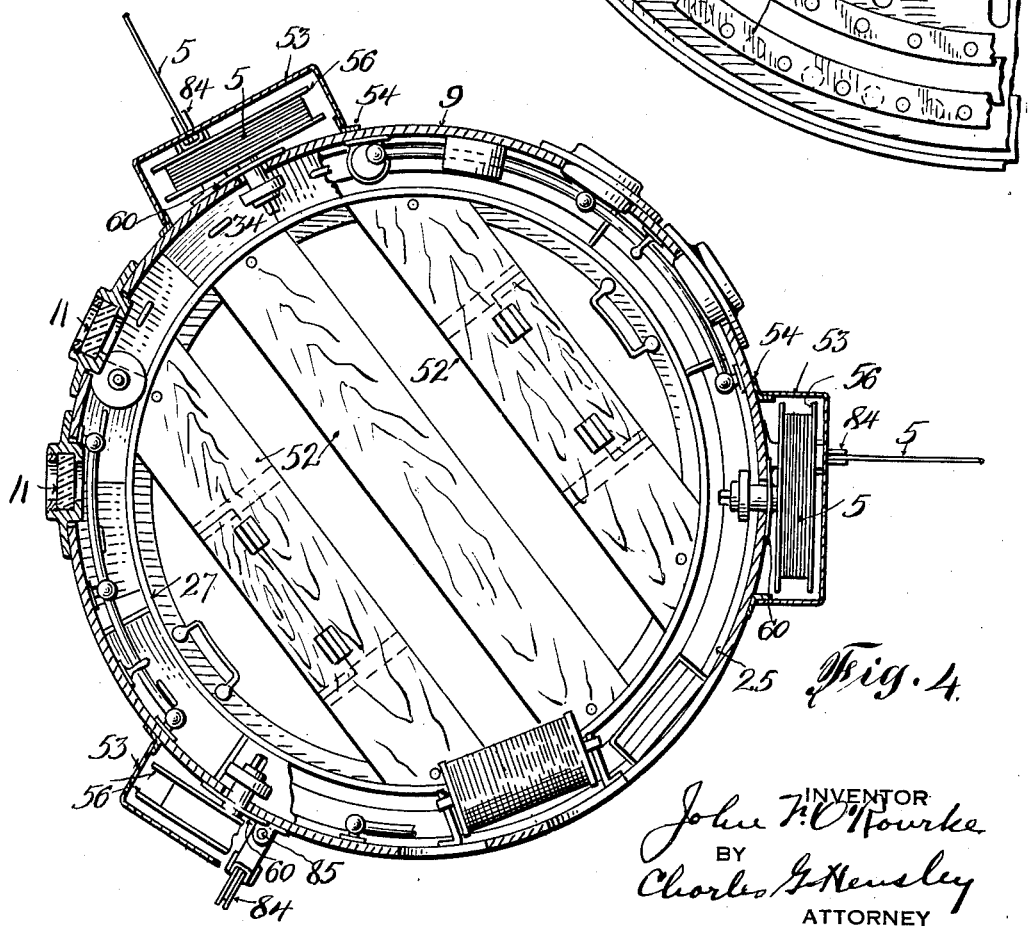

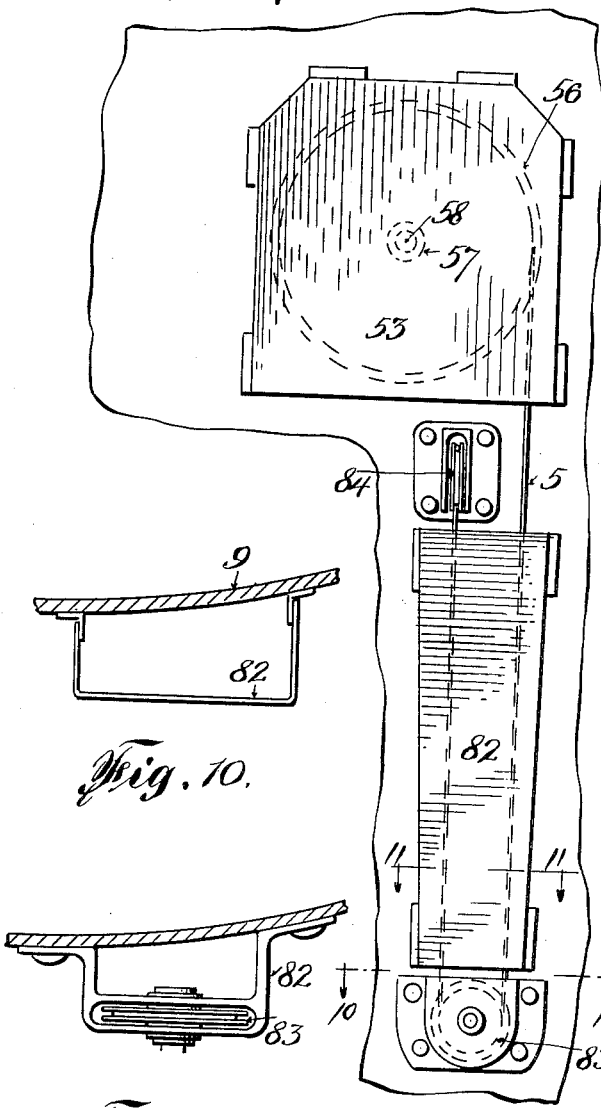

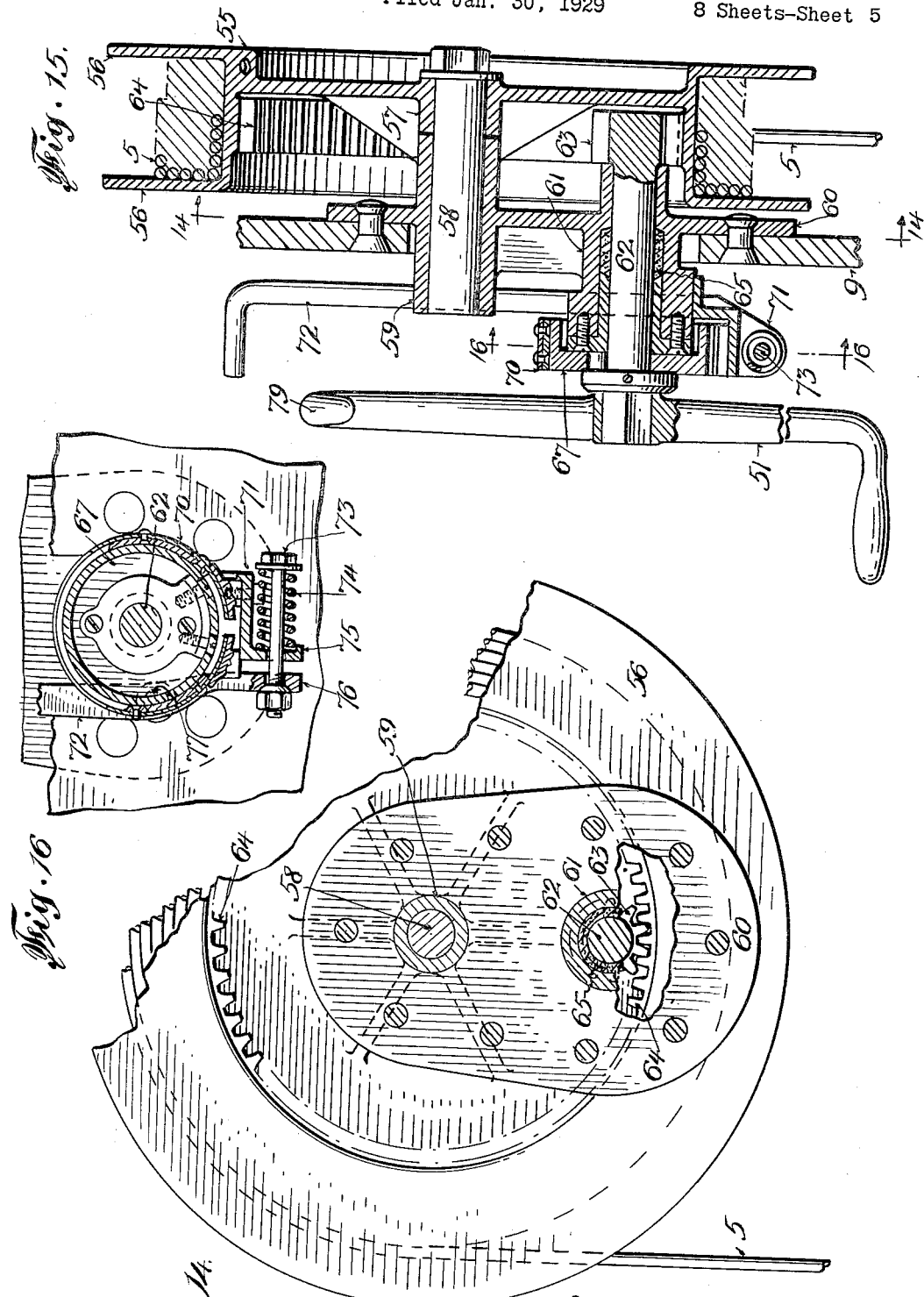

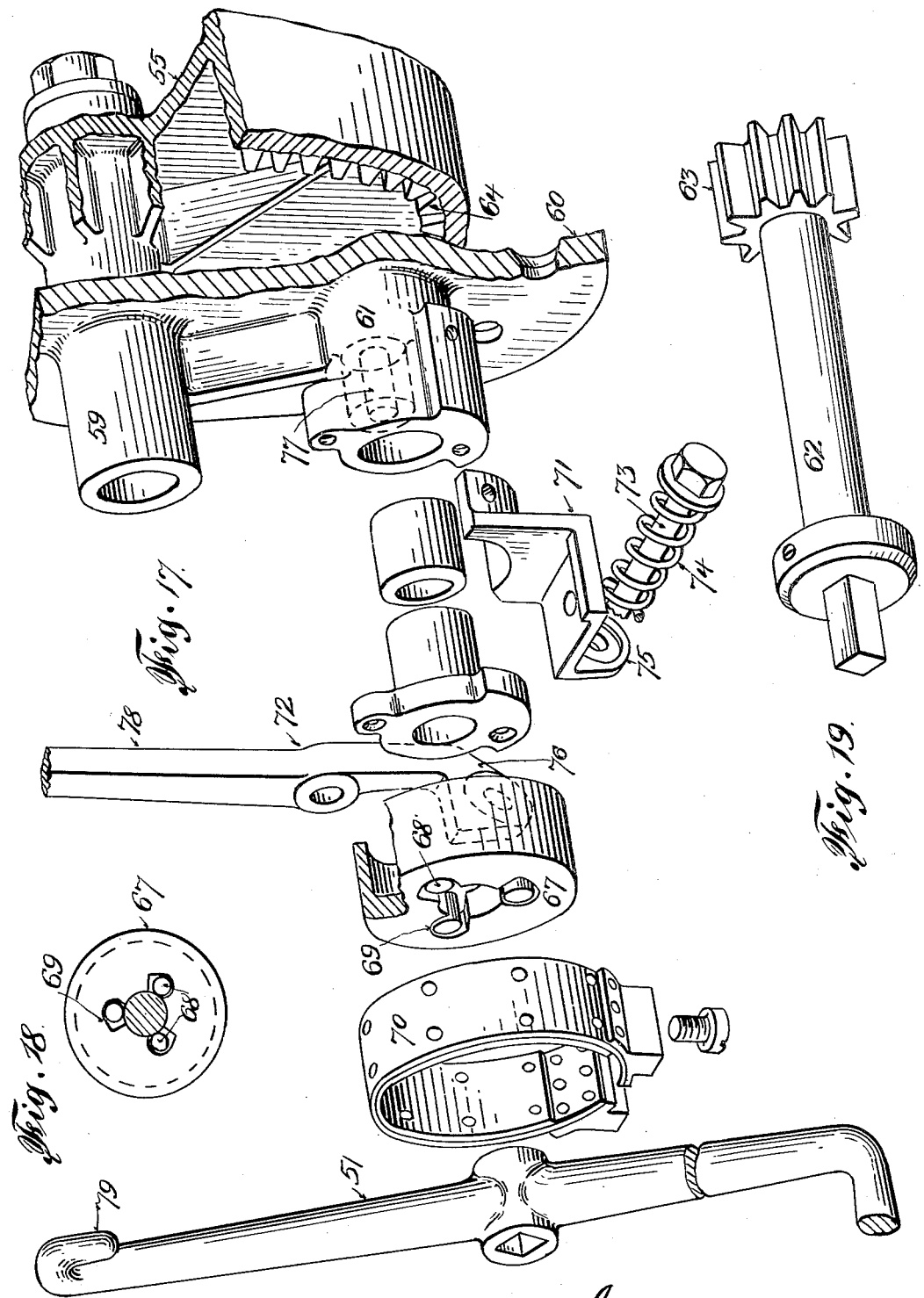

Feb. 27, 1934.  J. F. O'ROURKE  1,948,934
SUBMARINE AIRLOCK
Filed Jan. 30, 1929    8 Sheets-Sheet 7
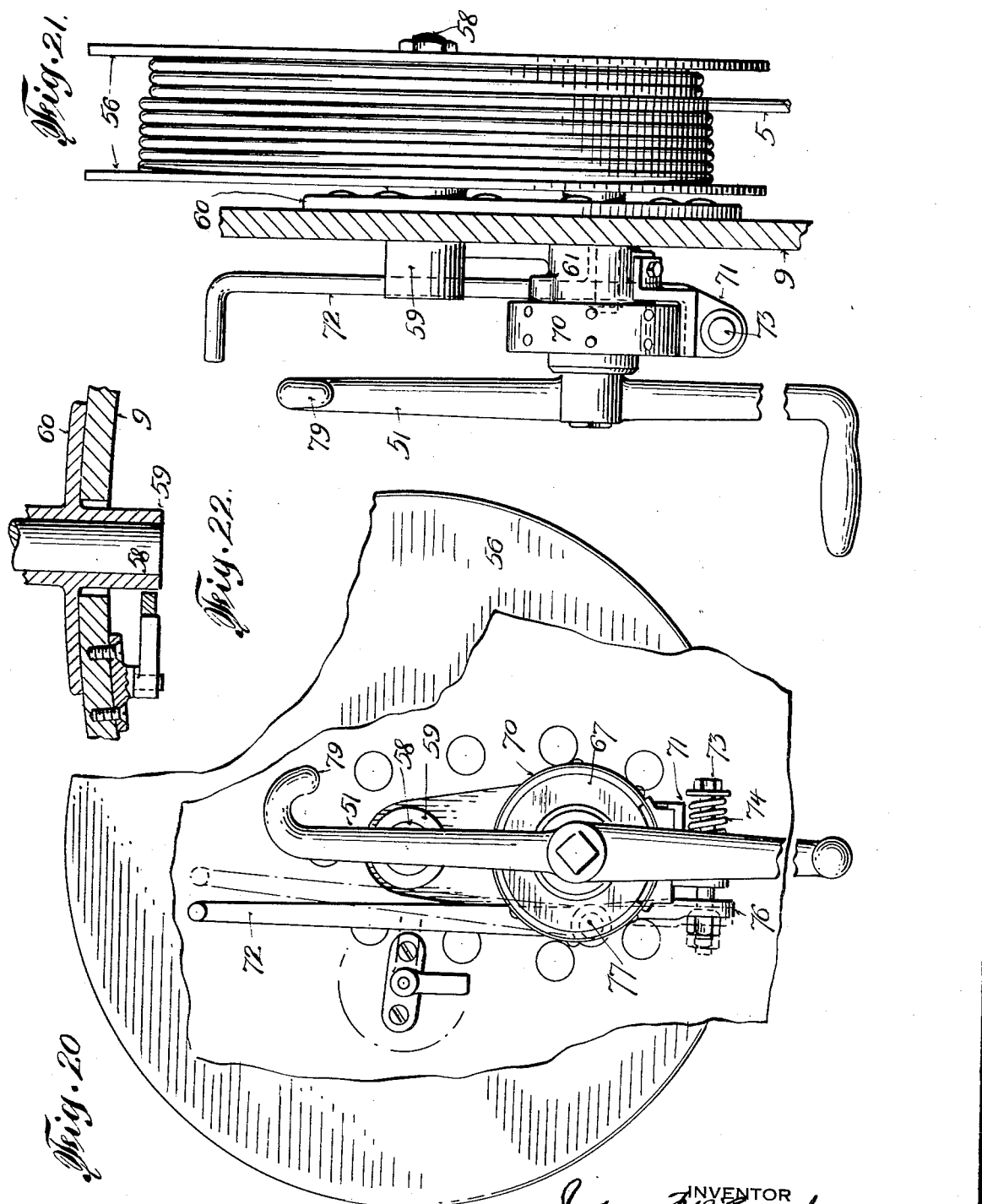

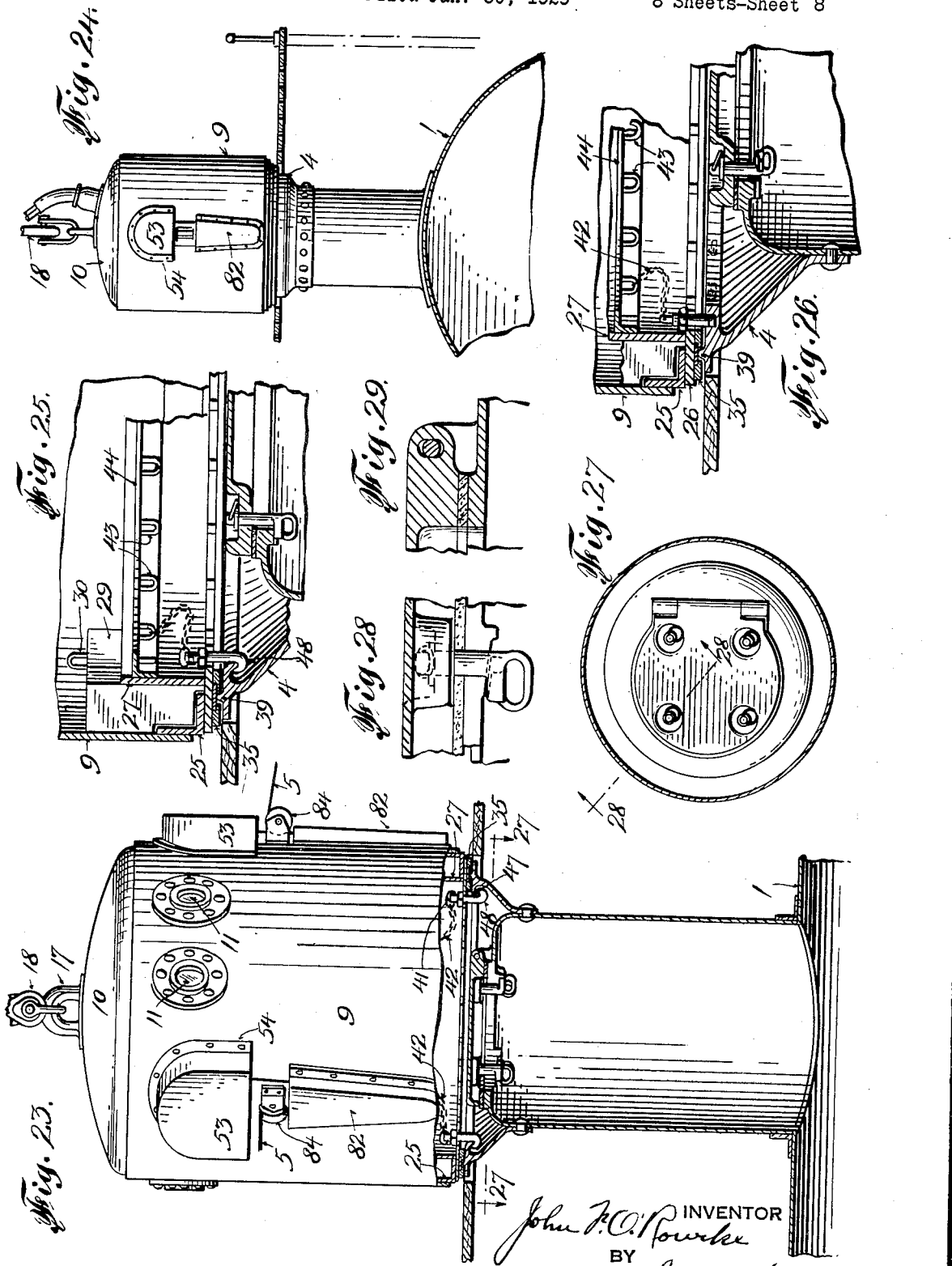

Patented Feb. 27, 1934

1,948,934

UNITED STATES PATENT OFFICE 1,948,934

SUBMARINE AIRLOCK

John F. O'Rourke, New York, N. Y.

Application January 30, 1929. Serial No. 336,148

8 Claims. (Cl. 61—69)

My invention relates to submarine airlocks.

The object of the present invention is to provide a diving apparatus, such as a submarine airlock, having means by which the crew within the airlock may draw it into any desired position or hold it laterally in any desired position, notwithstanding the tendency of the water currents to displace it. The purpose is, of course, to permit the crew to accurately position the airlock while submerged in the water, either with or against tidal currents, to carry on subsea operations and more especially to locate the diving airlock approximate to a special coaming surrounding the hatch of a sunken vessel, so that it may be attached to the vessel in a water-tight manner to permit air pressure in the airlock to be reduced so that the hatch may be opened for the escape of the crew of the vessel, and for carrying on salvaging operations; or the submarine airlock, by the use of the apparatus herein described, may be attached to a portion of the deck or the hull plate of a submerged vessel to permit an opening to be made therethrough for similar purposes.

The lateral movement of a diving bell cannot be controlled by the crew within the bell under any of the previous devices heretofore proposed, so as to overcome the effect of tides and currents. The relatively large bulk of the diving bell compared with its small negative buoyancy renders it difficult of management through the hoisting cable in tides or currents. By the use of the present invention it is possible to avoid the loss of time heretofore consumed in making preliminary diving explorations because the present device enables the crew of a diving airlock to draw the latter quickly in any direction and to hold it where desired regardless of whether the diving airlock is positioned in still water or in strong currents.

With the present invention the dividing airlock may be lowered into or taken from the water by heavy tackle and it may be handled while in the water by a single whip hoisting cable, controlled by signals transmitted by telephone between the diving airlock and the surface vessel. In my application Serial No. 105,676, filed April 20, 1926, I showed movable captured weights for manipulating the diving airlock and these may be used in conjunction with the anchors and cables herein described to enable the crew to control not only the lateral position of the diving apparatus but also its vertical position while being brought to position on the vessel to be operated upon. While the diving airlock is being lowered under its relatively small negative buoyancy it can be given positive buoyancy by unshipping to the sea bottom or to the deck of the submerged vessel, one or more of the movable weights referred to, a pair of heavy movable weights being unshipped when the crew is carried by the diving airlock, or lighter weights may be unshipped if the crew is carried independently of the airlock as when on the deck of the submerged vessel.

After these weights have been unshipped, the height of the diving air lock may be regulated through the tackle connected with the unshipped weights, during which time the hoisting cable connected with the surface vessel may be slacked off to leave the diving air lock subject to the manipulation through the said weights. Where the crew is carried with the diving air lock one member thereof may be equipped as a diver and may be supplied with compressed air from a connection within the diving air lock and such member can emerge from under the anchored diving air lock while the latter is held vertically by the movable weights and he may operate at a point where the subsequent operations are to be carried on, both with great economy of time and without risk of interruptions, such as occur where similar diving operations are carried on solely from the surface vessel.

With the present invention vertical adjustments of the position of the diving air lock, when brought near the position of operation, may be controlled by the crew within the diving air lock and in addition lateral adjustments of the position of the diving air lock in all directions may also be effected by the crew within the diving air lock notwithstanding the effect of currents on the same. The lateral adjustments are accomplished by locating anchors or weights at different points of the compass and at points separated some distance from the diving air lock, the weights being connected therewith by suitable cables which may be manipulated by members of the crew within the diving apparatus through suitable winding drums located on the exterior of the diving air lock but operated from within the same.

These devices may be operated in the manner hereinafter described in conjunction with a diving air lock having an open bottom from which water is excluded by compressed air within the diving air lock and without interfering with the attachment of the diving air lock at its open bottom with the submerged vessel.

In addition, my invention embodies simple means for attaching the open bottom of the diving air lock to a submerged vessel by watertight connection and in the shortest possible time. The present invention may be advantageously used in conjunction with the device for manipulating diving apparatus from a surface vessel, as shown and described in my copending application Serial No. 336,147 and filed concurrently herewith. Other advantages and features of my invention will be set forth in the following detailed description of my invention.

In the drawings forming part of this application,

Figure 1 is a schematic view illustrating the manner of manipulating the diving air lock to locate it in relation to a submerged vessel for rescue and salvaging operations, Figure 2 is a vertical, sectional view through the diving air lock, Figure 3 is a detail view showing the method of detachably securing the heavy cable for lowering the diving air lock from a surface vessel into and out of the water, Figure 4 is a horizontal, sectional view of the diving air lock showing, among other things, the drums for controlling the cables connected with the weights or anchors for lateral movement or control of the diving air lock, Figure 5 is an inverted plan view of a portion of the lower end of the diving air lock, Figure 6 is a horizontal, sectional view showing the major portion of the diving air lock in plan, Figure 7 is a detail view of a portion of the exterior of the diving air lock, showing the means for operating the lateral guiding cables, Figure 8 is an enlarged, sectional view of the lower end of the diving air lock illustrating the manner of attaching it to the submerged vessel, Figure 9 is an enlarged, perspective view of a portion of an annular bracket for holding the attaching bolts, Figure 10 is a sectional view taken on the line 10—10 of Figure 7, Figure 11 is a sectional view taken on the line 11—11 of Figure 7, Figure 12 is a perspective view of one of the heavier weights for controlling the buoyancy of the diving air lock, Figure 13 is a similar view of one of the lighter weights used for the same purpose, Figure 14 is a sectional view taken on the line 14—14 of Figure 15 and showing part of the apparatus for controlling lateral control cables, Figure 15 is a vertical, sectional view through the same device, Figure 16 is a sectional view taken on the line 16—16 of Figure 15, Figure 17 is a perspective view of the parts of the mechanism for drawing in and paying out the lateral control cables, Figure 18 is a sectional view illustrating the clutch employed in said device, Figure 19 is a perspective view of the pinion for operating the annular gear, Figure 20 is an elevation of the device for taking in and paying out the lateral control cables, Figure 21 is a sectional view through the wall of the diving airlock and illustrating the same device in elevation, Figure 22 is a detail sectional view of a portion of said device, Fig. 23 is a view in elevation partly sectioned showing the device attached to the hatch trunk of a submarine;

Fig. 24 is another view in elevation of the device displaced 90 degrees from the position of Fig. 23;

Fig. 25 is a fragmentary sectional view of the lower end of the air lock illustrating its position with respect to the hatch of the submarine;

Fig. 26 is a similar view illustrating the use of stud bolts in place of the hook bolts shown in Fig. 25;

Fig. 27 is a plan sectional view through line 27—27 of Fig. 23;

Fig. 28 is a fragmentary sectional view in an enlarged scale through line 28—28 of Fig. 27; and Fig. 29 is a fragmentary sectional elevation illustrating the manner of mounting the hatch on its support.

Figure 1:
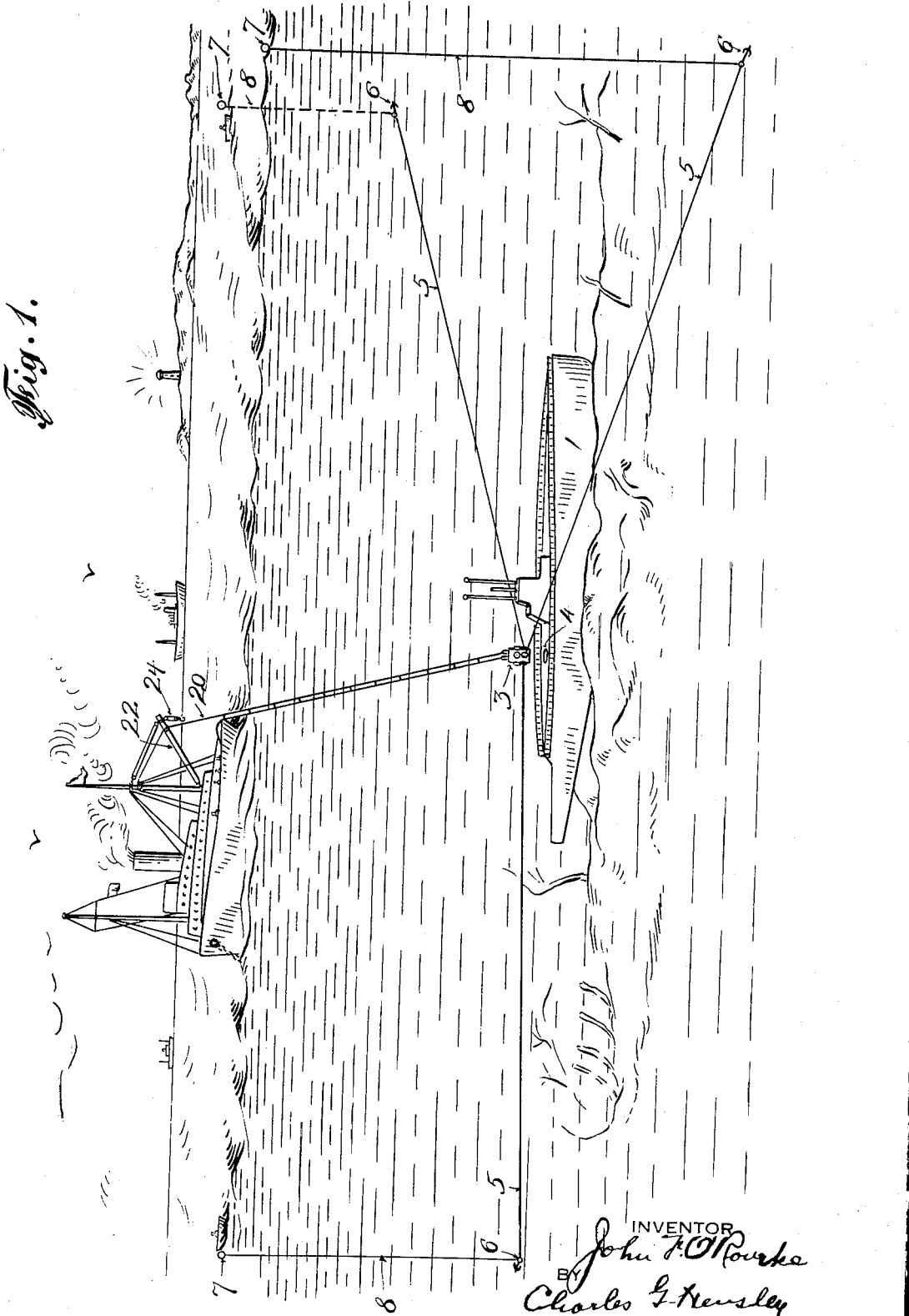

Figure 1 shows in perspective a sunken vessel 1 on which rescue or salvaging operations are to be performed, together with a rescue ship or surface vessel 2 in the act of lowering the submarine airlock 3 toward the sunken vessel. The latter has one or more of its hatches surrounded by a coaming 4 with which the airlock is adapted to be attached to secure water-tight connection between it and the submerged vessel. The submarine airlock is shown provided with three lateral control cables 5 the ends of which are wound on drums disposed outside of but operated from within the diving apparatus for the purpose of controlling the lateral position of the latter or for holding it against lateral displacement in every direction against currents or other influences. Anchors or weights 6 are connected with the opposite ends of these lateral controlling cables and they are placed in selected positions about the time the diving apparatus is placed in the water, from boats standing by, a buoy 7 floating above each anchor, the anchors being disposed at various points of the compass from the diving airlock after the latter has been lowered into the water. The position of these remote anchors may be changed by direction of the crew within the diving airlock when necessary through suitable directions by means of the telephone connections to the surface vessel.

Each anchor may have a buoy 7 connected by a line 8, the purpose of the buoy being to indicate at the water surface the approximate locations of the several controlling anchors and enable the men in the boats attending them to change their location as directed and to raise them without assistance from the cables between the anchors and the diving airlock. At 2 I have shown a rescue or surface vessel provided with suitable tackle and a derrick for lowering the diving airlock into and lifting it from the water. The details of the diving apparatus are shown more fully in the remaining figures of the drawings.

In Figure 2 I have shown by way of example a diving apparatus having a cylindrical body 9 provided at its top with an arched or rounded top wall 10 connected with the side wall by watertight connection. Port holes in pairs covered by observation glasses 11 may be arranged at different points around the side wall of the apparatus to permit members of the crew within to illuminate by searchlight and see their surroundings and portions of the submerged vessel, to control the positioning of the diving apparatus in relation thereto. I have also shown telephone instruments 12 arranged within the airlock and connected by suitable cables 13 with the surface vessel whereby instructions may be transmitted from the crew within the diving apparatus to the crew on the surface vessel and vice versa. I have also shown pipes 14 controlled by valves 15 for supplying compressed air to the interior of the diving bell to prevent water entering the latter, and these pipes may be carried through a common sheathing with the telephone cable and all are connected with the surface vessel.

The crew within the airlock, by manipulating the valves 15, may admit compressed air supplied from the surface vessel into the diving airlock for the operations hereinafter described. There is a hose connected with the airlock equipped with suitable valves for admitting or excluding air at atmospheric pressure. I have also shown a tank 16 within the apparatus for supplying hydrogen when necessary to exclude water from contact with the object being burned through by the electric apparatus for that purpose by the crew or to a member supplied with a diving suit and operating from the airlock as a base. The top of the apparatus is provided with a loop 17 with which the hanger 18 engages and at the upper end of this hanger there is a ring 19 to which one end of the hook 21 of the single whip 20 engages, this whip running to the derrick 22 on the surface vessel. The hook 23 is connected with the heavier tackle 24 for placing the apparatus over board and for carrying its weight until it is partially overcome by the buoyancy of the device in water. After the apparatus has been placed into the water the hook 23 may be disengaged from the ring 19 so that the lowering and raising operations from the rescue ship of the submarine airlock, while in the water, may be carried on entirely with the single whip 20.

The bottom of the apparatus is shown provided with an annular, angle metal ring 25 which is riveted or otherwise secured to the inner surface of the airlock; and there is a bottom, annularly shaped plate 26 bolted or otherwise secured to the horizontal flange of the metal ring 25. The annular member 27 disposed with its wall vertical, and spaced from the wall of the apparatus to provide a pocket 28 for the movable weights, rests on the annular member 26 and is preferably welded thereto. The movable weights 29 which I have shown relatively large, are provided with loops 30 at the top, to which suitable tackle 31 may be connected for controlling these weights.

In Figure 2 I have shown the block 32 cooperating with a fall 33 the former being secured to the top of the apparatus; and the cable 31 engages around the block and fall for the purpose of raising and lowering the weights 29 in the manner hereinafter described. These weights are adapted to fit the irregular space 28 between the vertical wall 27 and the wall of the apparatus to be out of the way of the crew while manipulating the airlock. I have shown other weights 34, smaller than the first ones, and these are also provided with eyes or loops 30 to be engaged by the tackle for the purposes hereinafter described.

On the under side of the plate 26 there are secured annular plates 35 concentric with relation to each other and having grooves 36 to form pockets to receive the inner and outer edges of an annular gasket 37 which is preferably made of rubber. There is an opening 38 between these plates 35 into which is adapted to enter the bead 39 formed on the top surface of the coaming 4 which is supplied to or built upon the deck of the vessel surrounding the hatch. In the case of submarines this coaming will be attached to the hatch trunk to surround the hatch where rescue work is to be carried out in conjunction with a device embodying the present invention. When the bead 39 compresses the gasket 37 to a degree sufficient to secure a water-tight connection, the top surface of the coaming will seat against the plates 35 to support any additional pressure from the airlock on the coaming without further compressing the gasket 37 to a point where it might be destroyed. The inner edge of the horizontal plate 26 is provided with a number of notches 40 extending inwardly from the edge to receive the shanks of the coupling bolts 41 which are connected by the chains 42 with the loops 43 arranged around a flanged ring 44 attached to the vertical wall 9, so that when the bolts 46 are disengaged they will remain captured by the chains 42.

The inner side of the coaming is provided with a downwardly extending flange or bead 47 which is adapted to be engaged by the hooked end 48 of the bolts 46 so that when the engagement has been effected the wing nuts 49 may be turned to cause the bolts to draw upwardly on the flange 47 of the coaming and downwardly on the plate 26 to secure a water-tight connection between the diving air lock and the coaming. In addition, the horizontal plate 26 is provided with elongated apertures 50 through which may be inserted the hooked end of the crank handle 51 whereby this may be used to engage the flange 47 of the coaming for the purpose of working the diving air lock into position preparatory to the application of the bolts 46. Instead of being formed with a downwardly extending flange 47, the coaming may be formed with a flat flange as shown in Fig. 26 and stud bolts such as shown in said figure may be used instead of the hook bolts shown in Figs. 8, 25.

In Figs. 25, 26, 27, 28, I also show that the hatch may be secured in position by means of a plurality of through pins provided with a handle on the inside and a ring on the outside, making it possible to operate said pins either from the inside or the outside, the inner end of the pins extends laterally of the stem portion thereof, so that when the pins are set with said laterally extending portion directed outwardly as shown in Fig. 25, said laterally extending portion engages the underside of the flange at the upper end of the hatch trunk, securely locking the hatch in position. When the pins are turned 180 degrees from said position to the position shown in Fig. 26, the hatch can be opened. It will therefore be observed that the opening and closing of the hatch can be effected either from the inside or the outside of the submarine.

I have shown planks 52 which may be placed across the annular member 44 to form a temporary platform for the crew while the diving apparatus is being raised and lowered, and these planks may be raised and placed against the side wall when the apparatus has been attached to the submerged vessel.

The principal features of the present invention relate to the means for securing vertical and lateral control in the position of the submarine air lock. The vertical control is obtained through the movable weights 29, 34 and the tackle connected therewith, but the lateral control is effected by the mechanism shown in the drawings and which will be here described. There is a device for paying out and reeling up the several cables 5 which are connected with the controlling anchors 6 so that there will be one of these devices for each of the cables 5, parts of which are located on the exterior of the diving air lock, but the means for operating the same are arranged to be operated from within.

As each of these devices is of the same construction, a description of one will answer for all. There is a box or casing 53 secured by the brackets 54 to the exterior of the diving air lock which serves to enclose the winding drum to protect the same from injury, but this casing is not necessarily water-tight. The winding drum or reel 55 has flanges 56 to form a spool for receiving the cable 5 thereon, and this drum or reel is provided with a laterally extending boss 57 which is mounted to turn upon a shaft 58 which is fixed in a boss 59 forming a part of a plate 60 which is secured to the outer surface of the wall 9 of the apparatus by rivets or otherwise. The drum 55, therefore, is adapted to revolve upon the shaft 58 for the purpose of taking up and paying off the cable 5. The plate 60 has another boss or hub 61 projecting into the diving bell, and there is a revolvable shaft 62 extending through this boss and having on its outer end a pinion 63 which meshes with and operates the annular gear 64 formed on the inner side of the winding drum 55, so that through this pinion the winding drum may be revolved for taking up or paying out the cable 5. The shaft 62 passes through a stuffing box 65 in the hub 61 to form a water-excluding connection around this shaft. The inner end of the shaft 62 is provided with a hand crank 51 or any other device for revolving the shaft to operate the winding drum. Through these parts a member of the crew within the diving air lock may manipulate the winding drum 55. Preferably, suitable brake and clutch devices are incorporated in this operating mechanism, as shown in Figures 17 and 18. There is a brake drum 67 having rollers 68 arranged in grooves 69 in this drum which are adapted to clutch the shaft 62 in one direction and to permit the shaft to revolve freely in the opposite direction.

This drum is adapted to be engaged on its periphery with an expansible brake band 70 which is secured at one end to a bracket 71 and its opposite end is connected with a hand lever 72 through the medium of a bolt 73 which has a coiled spring 74 surrounding it and adapted to seat against the ear 75 of the bracket 71. One end of this bolt passes through the lever arm 76, which acts on one end of the brake band 70. This lever is pivoted on the pin 77 and the upper arm 78 is adapted to be manipulated by hand for the purpose of tightening the brake band 70 on the drum 67 and for releasing the cable drum 55. The hand crank 51 by which the shaft 62 is revolved, is shown provided with a hook 79 so that this crank handle may be removed and be used on the flange 47 of the coaming in holding the diving apparatus in the manner previously described.

Where the cable 5 leaves the winding drum 55 it passes downwardly inside a shield 82 attached to the side wall of the apparatus and then around an idler sheave 83 which is journaled in this shield, and thence upwardly to a sheave 84 which is attached by a vertical hinge 85 to the side wall of the apparatus. From the pivotal sheave 84 the cable leads out to the anchor 6 and if the latter is altered in its position with relation to the diving apparatus the sheave 84 may turn on its pivot 85 to accommodate the adjustment.

*Operation*

Assuming that rescue or salvaging operations are to be carried on in connection with a sunken submarine vessel which has previously been equipped with a coaming, as shown herein, the operations, while subject to variations, may be performed in the following manner:

The diving air lock is first lowered from the deck of the surface vessel by means of the heavy tackle 24 until it is placed into the water, after which the hook 23 on the lower end of this heavy tackle may be disengaged from the ring 19, leaving the air lock connected with the surface vessel through the single whip 20. This latter will be sufficient to control the lowering of the air lock because the latter is now submerged in the water and the single whip only has to support the weight of the diving apparatus and crew minus its buoyancy. While the diving air lock is being positioned near the vessel, it can, if desired, be given positive buoyancy by unshipping one or more of the heavy weights 29 which will remain captured through the tackle 31. While the tackle connected with the movable weights which have been unshipped is being manipulated, the hoisting cable 20 will be slacked off from the surface vessel. If desired, a member of the crew, equipped with diving apparatus and supplied with compressed air or oxygen from the diving air lock, can emerge through the open bottom, approximately at the position where the operations are to be carried on, and this diver may operate expeditiously and without risk of interruption in performing any duties regarding the position of the diving apparatus over the submerged vessel. The several anchors 6 will be moved out into position at different angles from the diving apparatus, preferably by small surface boats and these anchors will be lowered to the bottom and their positions will be approximately indicated by the buoys 7, which remain connected to the anchors by the lines 8. The several cables 5 which are connected with these anchors are the cables which are wound upon the winding drums 55 on the exterior of the diving apparatus.

The several cables 5 may be individually wound up or paid off by members of the crew within the air lock by operating the hand cranks 51 on any one of the shafts 62 for the purpose of revolving the respective winding drum. If, during the lowering of the apparatus any obstructing portion of the submerged ship is encountered, the several cables 5 are drawn tight and are held by the brakes 70 on the several drums 67. Members of the crew may then manipulate the boat hooks 80 through the open bottom of the bell, resting them on the obstruction of the submerged vessel while the obstruction is being cut away by means of an electro-oxygen torch. During this operation the slight negative buoyancy of the diving air lock is supported by the crew with the boat hooks 80 but should the obstruction require any considerable time or effort for its removal, then instead of depending on the boat hooks, as above stated, one or more of the movable weights 29 may be lowered to the deck of the sunken vessel to increase the buoyancy of the air lock and then the latter can be held at the desired height above the obstruction by manipulating the tackles 31 connected with the unshipped weights. The unshipping of these weights gives the air lock a positive buoyancy tending to raise it and the tackle on the unshipped weights resists the buoyancy and maintains the air lock at the desired height for the operations for removing the obstruction. The diving apparatus may thus be held stationary at any desired height, whereas its lateral position is controlled by means of the cables 5. With the hoisting cable 20 slacked off, the position of the diving air lock would be made stable, notwithstanding heavy seas and strong currents, so that the entire crew within the diving air lock may be available for removing the obstruction.

After the removal of any obstruction, the apparatus may be further lowered by drawing it down by means of the tackle 31 on the unshipped weights, until the bottom of the diving apparatus rests on the superstructure deck near the coaming 4. The members of the crew may then carry the airlock, using handles, to a position over the coaming and if necessary detach the crank handles 51 and insert the crooked ends 79 through the openings 50 of the plate 26 and engage the hooks onto the flange 47 of the coaming and manipulate the same to bring the bead 39 and the washer 37 into register and to then hold the diving airlock until the clamping bolts 46 have been placed in position and tightened.

The use of compressed air in the diving airlock to exclude the water at the open end is all described in my said co-pending applications.

From the above it will be apparent that I have provided means for controlling the positioning of the diving airlock vertically either by members of the crew operating from within the diving airlock itself, or adjacent thereto in diving suits, and I have also provided means for obtaining lateral positioning and control also from within the diving airlock. This eliminates the necessity of positioning the diving airlock in relation to the submerged vessel by operations carried on at the surface vessel. It reduces the time necessary for the attachment of the diving airlock to the submerged vessel, and it permits the operations to be carried on without regard to whether the water at the surface is rough. Furthermore, the lateral controlling means permits the diving airlock to be accurately located and to be securely held notwithstanding the tendency of currents or undertows to displace it, so that the operations may be carried on regardless of the direction of the tide or of the effect of currents.

Having described my invention, what I claim is:

1. In a device of the class described the combination of a vessel having a coaming provided with an annular seat having a raised bead, a diving air lock comprising a body forming a chamber adapted to be submerged and to be brought into water-tight relation with said coaming, said chamber having an open bottom, concentric rings arranged around said open bottom with their edges spaced apart, and a compressible gasket held between the edges of said annular rings, the bead on said coaming being adapted to register with and to project within the annular space between said rings to compress said gasket, the seat of said coaming being adapted to engage said annular rings after said gasket has been partially compressed by said bead.

2. In a device of the class described, the combination with a body forming a hollow chamber having an open bottom, of an annular flange adjacent the open bottom of said chamber, said flange being provided with a plurality of circumferentially spaced radial slots, and hook shaped bolts operable from the inside of said chamber insertable within said slots to connect the open bottom thereof onto a vessel having a coaming provided with an inwardly extending flange, the hook portion of said bolts being adapted to engage said flange to effect said connection.

3. In a device of the class described, the combination with a body forming a hollow chamber having an open bottom, of an annular flange adjacent the open bottom of said chamber, said flange being provided with a plurality of circumferentially spaced substantially radial slots, hook shaped bolts operable from the inside of said chamber insertable within said slots to connect the open bottom thereof onto a vessel having a coaming provided with an inwardly extending flange, the hook portion of said bolts being adapted to engage said flange to effect said connection, and flexible means for suspending said bolts from the inside of said chamber.

4. In a device of the class described, the combination with a body forming a hollow chamber having an open bottom, of an annular flange adjacent the open bottom of said chamber, said flange being provided with a plurality of circumferentially spaced substantially radial slots, hook shaped bolts operable from the inside of said chamber insertable within said slots to connect the open bottom thereof onto a vessel having a coaming provided with an inwardly extending flange, the hook portion of said bolts being adapted to engage said flange to effect said connection, and packing means for insuring the tightness of the connection effected by said bolts.

5. In a device of the class described, the combination of a body forming a chamber having an open bottom and adapted to be submerged, means manipulatable through said open bottom for attaching the body by a leak-proof joint with a submerged object, anchoring means connected with said chamber by cables, said anchoring means being adapted to be located at different points around an object upon which the body is to be anchored, and means for operating said cables including members extending through the wall of said body and provided on the exterior of said body with means for taking up and paying out said cables for the purpose of positioning and holding said body.

6. In a device of the class described, the combination of a body forming a chamber adapted to be submerged, means manipulatable through said open bottom for attaching the body by a leak-proof joint with a submerged object, anchoring means connected with said chamber by cables, said anchoring means being adapted to be located at different points around an object to which the body is to be attached and said chamber in laterally spaced relation thereto, and to rest on the sea bottom, said cables being attached to means on the outside of said chamber to take up and pay out said cables operable from within by means passing through side walls of said body for the purpose of moving and guiding the chamber to an object to which the body is to be attached and for positioning and holding said chamber in operative relation to an object in its submerged condition.

7. The method of controlling the lateral displacement of a submerged diving apparatus suspended from a cable and locating it with respect to an object to which it is to be attached, consisting of maintaining a pull on said diving apparatus to hold it against tide and current pressure, and anchoring means by which said pull is exerted at different positions spaced substantial distances from the object and in regulating the degree of force exerted by the device employed to exert the aforesaid pull whereby the action of the tide and current and the aforesaid instrumentalities locate the diving apparatus in registry with the submerged object.

8. A device of the class described, the combination of a vessel having a coaming, a diving air-lock comprising a body forming a chamber adapted to be submerged including means to effect a water-tight joint between the said air lock and said coaming, said chamber having an open bottom through which the aforesaid air-tight joint is formed, and means extensible from said air lock anchored at substantial distances from the vessel and at different angles from the said vessel, and means whereby pull is exerted on said extensible means to move the air lock with respect to the force of tide and current for centering the air lock with respect to the submerged vessel.

JOHN F. O'ROURKE.